United States Patent [19]

Long, II et al.

[11] Patent Number: 5,288,814
[45] Date of Patent: Feb. 22, 1994

[54] EASY TO DISPERSE POLYCARBOXYLIC ACID THICKENERS

[75] Inventors: Carl J. Long, II, Elyria; Zahid Amjad, Brecksville; William F. Masler, III, Hinckley; William H. Wingo, North Royalton, all of Ohio

[73] Assignee: The B. F. Goodrich Company, Akron, Ohio

[21] Appl. No.: 935,616

[22] Filed: Aug. 26, 1992

[51] Int. Cl.$^5$ .................. C08F 2/26; C08F 2/08
[52] U.S. Cl. .................. 525/450; 525/379; 524/801; 528/76; 526/193; 526/209
[58] Field of Search .......... 525/450, 379; 524/801; 528/76; 526/193, 209

[56] References Cited

U.S. PATENT DOCUMENTS

| | | | |
|---|---|---|---|
| 4,180,619 | 12/1979 | Makhlouf et al. | 220/6 |
| 4,203,877 | 5/1980 | Baker | 65/26 |
| 4,375,533 | 3/1983 | Park | 22/4 |
| 4,419,502 | 12/1983 | Sehm | 2/8 |
| 4,420,596 | 12/1983 | Lochhead | 2/8 |
| 4,526,937 | 7/1985 | Hsu | 2/8 |
| 4,692,502 | 9/1987 | Uebele | 2/8 |
| 4,885,350 | 12/1992 | Yamashita | 2/14 |
| 4,911,736 | 3/1990 | Huang | 1/32 |

*Primary Examiner*—James J. Seidleck
*Assistant Examiner*—I. Zemel
*Attorney, Agent, or Firm*—George W. Moxon, II

[57] ABSTRACT

An interpolymer of at least one olefinically unsaturated carboxylic acid containing at least one activated carbon-to-carbon olefinic double bond and at least one carboxyl group, in an amount of more than 15% by weight based upon the weight of the interpolymer, and at least one steric stabilizer surfactant having at least one hydrophilic moiety and at least one hydrophobic moiety and a linear block or a random comb configuration, or mixtures thereof, made by polymerizing olefinically unsaturated carboxylic acid monomers in an organic media, in the presence of free a radical forming catalyst, and the steric stabilizer.

22 Claims, No Drawings

EASY TO DISPERSE POLYCARBOXYLIC ACID THICKENERS

BACKGROUND OF THE INVENTION

This invention relates to an interpolymer of olefinically unsaturated carboxylic acids or anhydrides and a polymeric surface active agent (or surfactant), having a linear block or random comb configuration which provides a steric stabilizing component to the interpolymer and produces a polymer which is easier to disperse and handle.

Carboxyl containing polymers of vinyl or vinylidene monomers containing at least one terminal $CH_2=C<$ group are well known. Such polymers may be homopolymers of unsaturated polymerizable carboxylic acids, such as acrylic acid, methacrylic acid, maleic acid, maleic anhydride, itaconic acid and the like; or copolymers of said acid or anhydride monomers with (meth)acrylate esters, (meth)acrylamides, olefins, maleic anhydrides, vinyl esters, vinyl ethers, and styrenics; or copolymers with other vinyl or vinylidene monomers. Often, copolymers of these acids are cross-linked with small amounts of cross-linking agents. These materials are normally prepared by polymerization with a free radical catalyst in an organic medium in a closed vessel or autoclave equipped with stirring. During the course of such polymerizations, the polymer begins to precipitate from the solution as it is formed and flocculates and forms aggregates. The precipitated polymer is then recovered and dried to remove residual solvent. The polymer, which is now in a powder form, is used usually by dispersing it in water, neutralizing it, and adding it to a liquid to use its thickening ability. Such polymers are disclosed in U.S. Pat. Nos. 2,798,053; 3,915,921; 3,940,351; 4,062,817; 4,066,583; and 4,267,103.

Surfactants have been employed in the manufacture of carboxyl containing polymers because, in their manufacture, the aggregation of the polymer can interfere with the polymerization reaction by retarding access of the monomer to free radicals and by interfering with the removal of the heat produced by the polymerization. Further, the precipitated polymer forms a slurry in the solvent which becomes extremely thick, resulting in ineffective mixing and fouling on reactor surfaces. In response to these problems, and to increase the usually low total solids to a range of about 8 to 17 weight percent and increase productivity, a variety of surfactants have been employed.

For example, U.S. Pat. No. 4,375,533 to Park et al. discloses a process for overcoming some of the above problems, in which the polymerization of acrylic acid, and optional comonomers, in an organic media, is characterized by the use of nonionic surface active agents having a hydrophobe to lipophobe balance (HLB) values between 1 and about 10. U.S. Pat. No. 4,419,502, to Sehm, disclosed a process for the polymerization of acrylic acid and optional comonomers in the presence of a nonionic surface active agent selected from polyoxyethylene alkyl ethers and polyoxyethylene sorbitol esters and having an HLB value greater than 12. U.S. Pat. No. 4,420,596, to Lochhead et al., disclosed a process for polymerizing carboxylic acids in mineral spirits, employing nonionic surface active agents having HLB values less than 10. U.S. Pat. No. 4,526,937 to Hsu teaches the polymerization of acrylic acid in an organic solvent with a free radical catalyst, using nonionic block copolymers of propylene oxide and ethylene oxide to minimize undesirable flocculation and agglomeration. U.S. Pat. No. 4,692,502 to Uebele et al. teaches a process for polymerizing acrylic acid in an organic media with a free radical catalyst and at least one oil-soluble ionic surfactant selected from an anionic formula, a cationic formula, or an amphoteric formula to achieve reduced polymer build-up in the reactor and provide a more desirable particle size for the precipitated polymer.

SUMMARY OF THE INVENTION

The present invention resulted from the discovery that in polymerizing olefinically unsaturated carboxylic acid or anhydride monomers containing at least one activated carbon to carbon olefinic double bond and at least one carboxyl group, in an organic media, in the presence of free radical forming catalysts and at least one steric stabilizing polymeric surface active agent (also called surfactant), having at least one hydrophilic moiety and at least one hydrophobic moiety and a linear block or random comb configuration, or mixtures thereof or with other surfactants, an interpolymer, useful as a thickening and emulsifying agent, is produced which is easier to handle and to disperse. The carboxylic acid or anhydride will be more than 15% by weight of the interpolymer.

While we do not wish to be held to a specific theory or mechanism, the steric stabilizing surfactant appears to become a part of the polymer molecule by a bonding mechanism or by becoming entangled in the polymer as in an interpenetrating network or by some other force which seems to keep it associated with the polymer molecule. For the purposes of this patent application, we will refer to this as an interpolymer of the carboxylic acid polymer and the steric stabilizing surfactant. The steric stabilizing surfactant is a molecule of surfactant that has a hydrophilic portion which is associated with the polymer and a hydrophobic portion which extends from the polymer to provide steric stability. In any event, the resultant polymer possesses unexpectedly better handling and dispersing characteristics, as well as increased thickening efficiency at lower cross linker concentrations.

DETAILED DESCRIPTION

In accordance with the present invention, one is able to obtain an improved interpolymer which is easy to disperse and to handle, and yields lower dispersion viscosities, combined with favorable final application properties such as increased thickening efficiency. This product is achieved using a steric stabilizing surfactant (or steric stabilizer) which becomes associated with the resin in the final product as an interpolymer.

The steric stabilizer is a linear block copolymeric steric stabilizer, a random copolymeric comb steric stabilizer, or mixtures thereof, either alone or in combination with other surfactants. The amount of steric stabilizing surfactant used is in an amount of between about 0.001% and 20% based upon the weight of the vinylic monomers, i.e., the olefinically unsaturated carboxylic acids or anhydrides, to be polymerized, with 0.01 to 10% being preferred, and 0.2 to 6.0% being further preferred. The carboxylic acid or anhydride will comprise at least 15% by weight of the interpolymer, preferably at least 40% by weight of the interpolymer.

Polymerization of the carboxyl-containing monomers, optionally with other vinylidene comonomers, is usually carried out in the presence of a free radical catalyst in a closed vessel in an inert atmosphere under autogenous or artifically-induced pressure, or in an open vessel in an inert atmosphere optionally under reflux at atmospheric pressure. The temperature of the polymerization may be varied from about 0° to 125° C. or lower or higher. Polymerization at 25° to 90° C. using a free radical catalyst is generally effective in providing monomer to polymer conversions of 75 percent to 100 percent.

In the practice of the invention, the polymerizations may be either batch, semi-batch or continuous. The agitation may be any agitation sufficient to maintain the slurry and obtain effective heat transfer including, for example, helical agitation, pitched turbines and the like. A useful reaction temperature range is from the range of 20° C. to 90° C. at about 1 atmosphere or more. Normal polymerization time is from about 3 to 12 hours.

Typical free-radical forming catalysts include peroxygen compounds such as sodium, potassium and ammonium persulfates, caprylyl peroxide, benzoyl peroxide, hydrogen peroxide, pelargonyl peroxide, cumene hydroperoxides, diisopropyl peroxydicarbonate, tertiary butyl diperphthalate, tertiary butyl perbenzoate, sodium peracetate, di-(2-ethylhexyl) peroxy dicarbonate, and the like; as well as azo catalysts such as azobis-(isobutyronitrile). Other catalysts utilizable are the so-called "redox" type of catalyst and the heavy-metal activated catalyst systems. Ultraviolet light may also be used to generate free radicals. Some systems polymerize solely by heat, but catalysts generally provide better control. The monomers may be batch charged or continuously added during the course of polymerization or by any other manner of polymerization techniques conventionally used.

The polymerization reactions described herein are normally conducted in inert diluents that have solubilizing effect on one or more of the monomeric ingredients but substantially none on the resulting polymers. Stated differently, the medium used for the polymerization is an organic fluid, or mixtures of organic fluids, in which the monomers are preferably soluble but in which the polymer is substantially insoluble, so that the polymer product is preferably obtained as a fine friable or fluffy precipitate. Typical monomer solvents include liquid hydrocarbons selected from alkanes of 5 to 10, preferably 6 to 8 carbon atoms, such as hexane and heptane; cycloalkanes of 4 to 8, preferably 5 to 7 carbon atoms, such as cyclohexane; benzene and alkyl-substituted benzenes containing 1 to 2 lower alkyl substituents, preferably methyl substituents, such as toluene and xylene; alkyl carboxylates containing 1 to 6 preferably 1 to 4 carbon atoms in the alkyl groups and 2 to 6, preferably 2 to 4 carbon atoms in the carboxylate moiety, such as ethyl acetate, isopropyl acetate, propyl acetate, methyl acetate, and butyl acetate; haloalkanes and chlorofluoroalkanes, containing 1 to 3 carbon atoms and at least 2 halo groups, such as methylene chloride, ethylene dichloride, and 1,1,1-trichloroethane; ketones; and mineral spirits with a flash point greater than about 130° C. or mineral oil.

The amount of organic liquid solvent, such as benzene, used normally will be in excess of the components to be polymerized and the proportion may vary from at least 1 weight percent of the components and 99 percent solvent up to about 65 weight percent polymerizable components and 35 weight percent solvent. More normally, a concentration of about 10 to 60 percent components is employed, where the weight percent is based on the total amount of ingredients charged to vessel. In the present application, a concentration of 10 to 50 percent, based upon the vinylic monomers is preferred.

The carboxyl containing polymers are prepared from monomers containing at least one activated $>C=C<$ group and carboxyl group. Such polymers are homopolymers of an unsaturated, polymerizable carboxylic monomers such as acrylic acid, methacrylic acid, maleic acid, itaconic acid, maleic anhydride, and the like, and copolymers of polymerizable carboxylic monomers with acrylate esters, acrylamides, olefins, vinyl esters, vinyl ethers, or styrenics. The carboxyl containing polymers have molecular weights greater than about 500 to as high as several million, usually greater than about 10,000 to 900,000 or more.

Typical materials are those described in U.S. Pat. No. 2,798,053. Copolymers, for example, include copolymers of acrylic acid with small amounts of polyalkenyl polyether cross-linkers that are gel-like polymers, which, especially in the form of their salts, absorb large quantities of water or solvents with subsequent substantial increase in volume. Other useful carboxyl containing polymers are described in U.S. Pat. No. 3,940,351, directed to polymers of unsaturated carboxylic acid and at least one alkyl acrylic or methacrylic ester where the alkyl group contains 10 to 30 carbon atoms, and U.S. Pat. Nos. 5,034,486; 5,034,487; and 5,034,488; which are directed to maleic anhydride copolymers with vinyl ethers. Other types of such copolymers are described in U.S. Pat. No. 4,062,817 wherein the polymers described in U.S. Pat. No. 3,940,351 contain additionally another alkyl acrylic or methacrylic ester and the alkyl groups contain 1 to 8 carbon atoms. Carboxylic polymers and copolymers such as those of acrylic acid and methacrylic acid also may be cross-linked with polyfunctional materials as divinyl benzene, unsaturated diesters and the like, as is disclosed in U.S. Pat. Nos. 2,340,110; 2,340,111; and 2,533,635. The disclosures of all of these U.S. Patents are hereby incorporated herein by reference.

The carboxylic monomers are the olefinically-unsaturated carboxylic acids containing at least one activated carbon-to-carbon olefinic double bond, and at least one carboxyl group; that is, an acid or function readily converted to an acid containing an olefinic double bond which readily functions in polymerization because of its presence in the monomer molecule, either in the alpha-beta position with respect to a carboxyl group, —C=C—COOH; or as part of a terminal methylene grouping, $CH_2=C<$. Olefinically-unsaturated acids of this class include such materials as the acrylic acids typified by the acrylic acid itself, alpha-cyano acrylic acid, beta methylacrylic acid (crotonic acid), alpha-phenyl acrylic acid, beta-acryloxy propionic acid, cinnamic acid, p-chloro cinnamic acid, 1-carboxy-4-phenyl butadiene-1,3, itaconic acid, citraconic acid, mesaconic acid, glutaconic acid, aconitic acid, maleic acid, fumaric acid, and tricarboxy ethylene. As used herein, the term "carboxylic acid" includes the polycarboxylic acids and those acid anhydrides, such as maleic anhydride, wherein the anhydride group is formed by the elimination of one molecule of water from two carboxyl groups located on the same carboxylic acid molecule. Maleic anhydride and other acid anhydrides useful herein have the general structure

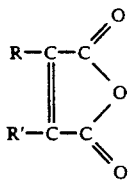

wherein R and R' are selected from the group consisting of hydrogen, halogen and cyanogen (—C≡N) groups and alkyl, aryl, alkaryl, aralkyl, and cycloalkyl groups such as methyl, ethyl, propyl, octyl, decyl, phenyl, tolyl, xylyl, benzyl, cyclohexyl, and the like.

The preferred carboxylic monomers are the monoolefinic acrylic acids having the general structure

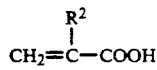

wherein $R^2$ is a substituent selected from the class consisting of hydrogen, halogen, and the cyanogen (—C≡N) groups, monovalent alkyl radicals, monovalent aryl radicals, monovalent aralkyl radicals, monovalent alkaryl radicals and monovalent cycloaliphatic radicals. Of this class, acrylic and methacrylic acid are most preferred. Other useful carboxylic monomers are maleic acid and its anhydride.

The polymers include both homopolymers of carboxylic acids or anhydrides thereof, or the defined carboxylic acids copolymerized with one or more other vinylidene monomers containing at least one terminal $>CH_2$ group. The other vinylidene monomers are present in an amount of less than 30 weight percent based upon the weight of the carboxylic acid or anhydride plus the vinylidene monomer(s). Such monomers include, for example, acrylate ester monomers including those acrylic acid ester monomers such as derivatives of an acrylic acid represented by the formula

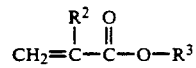

wherein $R^3$ is an alkyl group having from 1 to 30 carbon atoms, preferably 1 to 20 carbon atoms and $R_2$ is hydrogen, methyl or ethyl, present in the copolymer in amount, for example, from about 1 to 40 weight percent or more. Representative acrylates include methyl acrylate, ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, 2-ethylhexyl methacrylate, nonyl acrylate, hexyl acrylate, n-hexyl methacrylate, and the like. Higher alkyl acrylic esters are decyl acrylate, isodecyl methacrylate, lauryl acrylate, stearyl acrylate, behenyl acrylate and melissyl acrylate. Mixtures of two or three or more long chain acrylic esters may be successfully polymerized with one of the carboxylic monomers. Other comonomers include olefins, including alpha olefins, vinyl ethers, vinyl esters, and mixtures thereof.

The polymers also may be cross-linked with any polyene, e.g. decadiene or trivinyl cyclohexane; acrylamides, such as methylene bis acrylamide; polyfunctional acrylates, such as trimethylol propane triacrylate; or polyfunctional vinylidene monomer containing at least 2 terminal $CH_2<$ groups, including for example, butadiene, isoprene, divinyl benzene, divinyl naphthlene, allyl acrylates and the like. Particularly useful cross-linking monomers for use in preparing the copolymers are polyalkenyl polyethers having more than one alkenyl ether grouping per molecule. The most useful possess alkenyl groups in which an olefinic double bond is present attached to a terminal methylene grouping, $CH_2=C<$. They are made by the etherification of a polyhydric alcohol containing at least 2 carbon atoms and at least 2 hydroxyl groups. Compounds of this class may be produced by reacting an alkenyl halide, such as allyl chloride or allyl bromide, with a strongly alkaline aqueous solution of one or more polyhydric alcohols. The product may be a complex mixture of polyethers with varying numbers of ether groups. Analysis reveals the average number of ether groupings on each molecule. Efficiency of the polyether cross-linking agent increases with the number of potentially polymerizable groups on the molecule. It is preferred to utilize polyethers containing an average of two or more alkenyl ether groupings per molecule. Other cross-linking monomers include for example, diallyl esters, dimethallyl ethers, allyl or methallyl acrylates and acrylamides, tetraallyl tin, tetravinyl silane, polyalkenyl methanes, diacrylates, and dimethacrylates, divinyl compounds such as divinyl benzene, polyallyl phosphate, diallyloxy compounds and phosphite esters and the like. Typical agents are allyl pentaerythritol, allyl sucrose, trimethylolpropane triacrylate, 1,6-hexanediol diacrylate, trimethylolpropane diallyl ether, pentaerythritol triacrylate, tetramethylene dimethacrylate, ethylene diacrylate, ethylene dimethacrylate, triethylene glycol dimethacrylate, and the like. Allyl pentaerythritol, trimethylolpropane diallylether and allyl sucrose provide excellent polymers. When the cross-linking agent is present, the polymeric mixtures usually contain up to about 5% or more by weight of cross-linking monomer based on the total of carboxylic acid monomer, plus other monomers, if present, and more preferably about 0.01 to 3.0 weight percent.

Other vinylidene monomers may also be used, including the acrylic nitriles. The useful α,β-olefinically unsaturated nitriles are preferably the monoolefinically unsaturated nitriles having from 3 to 10 carbon atoms such as acrylonitrile, methacrylonitrile, and the like. Most preferred are acrylonitrile and methacrylonitrile. The amounts used are, for example, for some polymers are from about 1 to 30 weight percent of the total monomers copolymerized. Acrylic amides containing from 3 to 35 carbon atoms including monoolefinically unsaturated amides also may be used. Representative amides include acrylamide, methacrylamide, N-t-butyl acrylamide, N-cyclohexyl acrylamide, higher alkyl amides, where the alkyl group on the nitrogen contains from 8 to 32 carbon atoms, acrylic amides including N-alkylol amides of alpha,beta-olefinically unsaturated carboxylic acids including those having from 4 to 10 carbon atoms such as N-methylol acrylamide, N-propanol acrylamide, N-methylol methacrylamide, N-methylol maleimide, N-methylol maleamic acid esters, N-methylol-p-vinyl benzamide, and the like. Still further useful materials are alpha-olefins containing from 2 to 18 carbon atoms, more preferably from 2 to 8 carbon atoms; dienes containing from 4 to 10 carbon atoms; vinyl esters and allyl esters such as vinyl acetate; vinyl aromatics such as styrene, methyl styrene and chlorostyrene; vinyl and allyl ethers and ketones such as vinyl methyl ether and methyl vinyl ketone; chloroacrylates; cyanoalkyl acrylates such as α-cyanomethyl acrylate, and the α-, β-, and γ-cyanopropyl acrylates; alkoxyacrylates such as methoxy ethyl acrylate; haloacrylates as chloroethyl acrylate; vinyl halides and vinyl chloride, vinylidene chloride and the like; divinyls, diacrylates and other polyfunctional monomers such as divinyl ether, diethylene glycol diacrylate, ethylene glycol dimethacrylate, ethylene-bisacrylamide, allylpentaerythritol, and the like; and bis (β-haloalkyl) alkenyl phosphonates such as bis(β-chloroethyl) vinyl phosphonate and the like as are known to those skilled in the art. Copolymers wherein the carboxy containing monomer is a minor constituent, and the other vinylidene monomers present as major components are readily prepared in accordance with the process of this invention.

The steric stabilizer functions to provide a steric barrier which repulses approaching particles. A requirement for the steric stabilizer is that a segment of the dispersant (i.e., a hydrophobe) be very soluble in the solvent (the continuous phase in a nonaqueous dispersion polymerization process) and that another segment (i.e., a hydrophile) be at least strongly adhered to the growing polymer particle. Thus, the steric stabilizers of the present invention have a hydrophilic group and a hydrophobic group. The steric stabilizers are block copolymers comprising a soluble block and an anchor block having a molecular weight (i.e., chain length) usually well above 1000, but a hydrophobe length of more than 50 Angstroms, as calculated by the Law of Cosines. These dimensions are determined on the extended configuration using literature values for bond lengths and angles. Thus the steric stabilizers of the present invention are distinguishable from the prior art steric surfactants which may be block copolymers, but have hydrophobe lengths of less than 50 Angstroms. The steric stabilizer of the present invention has either a linear block or a comb configuration, and has a hydrophobe of sufficient length to provide a sufficient steric barrier.

When the steric stabilizer is a linear block copolymeric steric stabilizer, it is defined by the following formula:

where A is a hydrophilic moiety, having a solubility in water at 25° C. of 1% or greater, a molecular weight of from about 200 to about 50,000, and selected to be covalently bonded to the B blocks;

B is a hydrophobic moiety, having a molecular weight of from about 300 to about 60,000, a solubility of less than 1% in water at 25° C., capable of being covalently bonded to the A blocks;

C and D are terminating groups which can be A or B; can be the same or different groups, and will depend upon the manufacturing process since they are present to control the polymer length, to add other functionality, or as a result of the manufacturing process;

w is 0 or 1;
x is an integer of 1 or more,
y is 0 or 1, and
z is 0 or 1.

Examples of hydrophilic groups are polyethylene oxide, poly(1,3-dioxolane), copolymers of polyethylene oxide or poly(1,3-dioxolane), poly(2-methyl-2-oxazoline polyglycidyl trimethyl ammonium chloride, polymethylene oxide, and the like, with polyethylene oxide being preferred. Examples of hydrophobic groups are polyesters, such as those derived from 2-hydroxybutyric acid, 3-hydroxybutyric acid, 4-hydroxybutyric acid, 2-hydroxycaproic acid, 10-hydroxydecanoic acid, 12-hydroxydodecanoic acid, 16-hydroxyhexadecanoic acid, 2-hydroxyisobutyric acid, 2-(4-hydroxyphenoxy) propionic acid, 4-hydroxyphenylpyruvic acid, 12-hydroxystearic acid, 2-hydroxyvaleric acid, polylactones, such as caprolactone, butyrolactone, polylactams, such as those derived from caprolactam, polyurethanes, polyisobutylene, where the hydrophobe should provide a steric barrier of greater than 50 Angstroms, preferably greater than 75 Angstroms, with greater than 100 Angstroms being also preferred, and the like, with polyhydroxy fatty acids, such as poly(12-hydroxystearic acid) being preferred. The steric barrier is the length of the hydrophobe in its fully-extended condition. Such steric stabilizers are commercially available under the brand name Hypermer® from Imperial Chemical Industries, Inc.

Steric stabilizer molecules comprise both hydrophilic and hydrophobic units. Hydrophobic polymer units or hydrophobic blocks may be prepared by a number of well known methods. These methods include condensation reactions of hydroxy acids, condensation of polyols (preferably diols) with polycarboxylic acids (preferably diacids). Other useful methods include polymerization of lactones and lactams, and reactions of polyols with polyisocyanates. Hydrophobic blocks or polymer units can be reacted with hydrophilic units by such reactions as are known to those skilled in the art. These reactions include condensation reactions and coupling reactions, for example. Subsequent to the steric stabilizer preparation, the stabilizers may be further reacted with modifying agents to enhance their utility. U.S. Pat. No. 4,203,877 to Alan S. Baker teaches making such steric stabilizers, and the entire disclosure thereof is incorporated herein by reference.

When the steric stabilizer is a random copolymeric comb steric stabilizer, it is defined by the following formula:

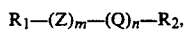

where $R_1$ and $R_2$ are terminating groups and may be the same or different and will be different from Z and Q, Z is a hydrophobic moiety having a solubility of less than 1% in water at 25° C., Q is a hydrophilic moiety, having a solubility of more than 1% in water at 25° C., m and n are integers of 1 or more, and are selected such that the molecular weight of the polymer is from about 100 to about 250,000.

Examples of the hydrophobic monomer unit or moiety are dimethyl siloxane, diphenyl siloxane, methylphenyl siloxane, alkyl acrylate, alkyl methacrylate, and the like, with dimethyl siloxane being preferred.

Examples of the hydrophilic monomer unit or moiety are methyl-3-polyethoxypropyl siloxane-Ω-phosphate or sulfate, and the alkali metal or ammonium salts derived therefrom; units derived from polyethoxy (meth)acrylate containing from 1 to 40 moles of ethylene oxide; acrylic acid; acrylamide; methacrylic acid, maleic anhydride; dimethyl amino ethyl (meth)acrylate; or its salts with methyl chloride or dimethyl sulfate; dimethyl amino propyl(meth)acrylamide and its salts with methyl chloride or dimethyl sulfate, and the like, with methyl-3-polyethoxypropyl siloxane-Ω-phosphate being preferred.

Examples of terminating agents are monohalo silanes, mercaptans, haloalkanes, alkyl aromatics, alcohols, and the like, which will produce terminating groups such as trialkyl silyl, alkyl, aryl alkyl, alcoholate, and the like, with the preferred terminating groups being trimethyl silyl.

An example of a random copolymeric comb steric stabilizer is a dimethicone copolyol phosphate which has the following formula:

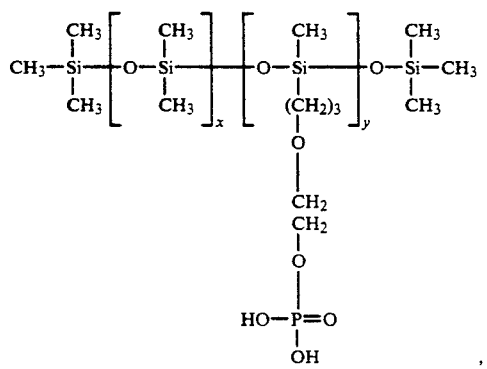

where x and y are integers greater than 1, and z is an integer from 1 to 100. Such a copolymeric comb steric stabilizer is available commercially under the trade name Pecosil from Phoenix Chemical, Somerville, N.J.

As noted earlier, the steric stabilizers of the appropriate structure in accordance with the present invention have the potential for becoming part of a (meth)acrylic acid or anhydride-containing polymer as an interpolymer by several mechanisms, including a bonding mechanism. These would include graft-type polymerization, hydrogen bonding, olefinic unsaturation polymerization, or condensation reaction. While we do not wish to be bound by a particular bonding mechanism theory, its explanation is felt to be helpful in understanding the invention.

In the graft-type mechanism, an abstractable hydrogen is removed from the stabilizer. The radical thus formed reacts with a growing polymer radical forming a covalent bond. With a stabilizer containing a poly(ethylene oxide) (PEO) segment, abstraction is reasonably postulated to occur α- to the ether oxygen, although other sites are possible. This is shown below:

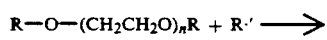

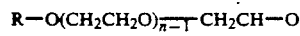

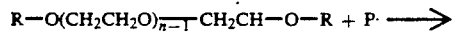

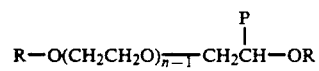

where
R=hydrophobe on steric stabilizer
R'=any free radical species
P=polymer chain
·denotes a free radical
n=an integer.

In the hydrogen bonding mechanism, the polyethylene oxide segment, which is known to hydrogen bond strongly to polycarboxylic acids, will react with the polycarboxylic acid and result in the formation of a hydrogen bonded complex. Typically, longer polyethylene oxide segments will give more strongly-bonded complexes.

Another possible bonding mechanism is the polymerization of olefinic unsaturation in the stabilizer with the growing polymer chain. Some stabilizers contain a certain degree of unsaturation and this unsaturation may react via the following general pathway:

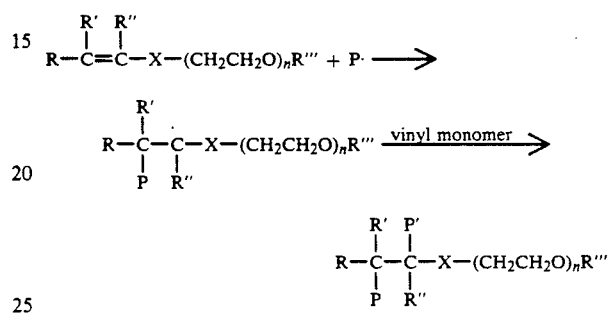

P=polymer chain
·denotes a free radical
X=divalent connecting linkage
P'=polymer chain derived from additional vinyl monomer
R, R' and R''=H or any substituent group
'''=hydrophobic substituent
n=an integer.

If the bonding mechanism is via a condensation reaction mechanism, one or more hydroxyl groups for example will react with the polymer bound carboxyl groups to form a covalent ester linkage as follows:

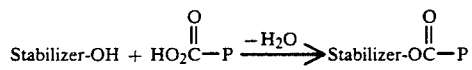

P = polymer chain.

TYPICAL EXAMPLES

In order to illustrate the present invention, a polymerization reaction was conducted in a water jacketed two liter Pyrex resin kettle equipped with mechanical stirrer, a thermometer and reflux condenser topped with a nitrogen inlet connected to a bubbler to provide a slightly positive pressure of nitrogen throughout the polymerization. The water jacket was connected to a constant temperature circulator. In producing an acrylic acid co-acrylate ester interpolymer (hereinafter referred to as the cointerpolymer), the resin kettle was charged with ethyl acetate (688.5 grams), cyclohexane (586.5 grams), acrylic acid (218.25 grams), stearyl methacrylate (6.75 grams), allylpentaerythritol (1.35 grams), and a steric stabilizing surface active agent in accordance with the present invention in a varied amount based upon the weight of the acrylic acid and co-acrylate ester monomers (i.e., phm or parts per hundred monomers). In making an acrylic acid interpolymer (hereinafter also referred to as AA interpolymer), no stearyl methacrylate was used, the amount of acrylic acid was 225 grams, the amount of allylpentaerythritol was 2.25 grams, and the amount of steric stabilizer was based upon the amount of acrylic acid monomer solids. In either case, the mixture was sparged with nitrogen for 30 minutes while the reactor was heated to 50° C. At 50° C., the sparging tube was removed while a nitrogen purge was maintained, stirring was begun, and the recipe amount of di-(2-ethylhexyl)-peroxydicarbonate (in an amount of 0.275 to 0.98 grams) was added. Polymerization was evident in a matter of minutes as the solution became hazy with precipitated polymer. If polymerization did not start within 15 minutes, the mixture was resparged. After several hours the mixture had become a thick slurry, and the polymerization was continued for a total of 8 hours. The polymer slurry was then transferred to a single neck flask and the solvent was removed by a rotary evaporator at 95° to 105° C. at 27 inches of vacuum. The resulting dry polymer product was a fine white AA interpolymer or co-interpolymer powder. When dispersed in water, the polymer began to hydrate, and when neutralized, thickened aqueous solutions.

Polymer Characterization

To characterize the resin in terms of its usefulness for dispersing and thickening, tests were made to determine the dispersibility of the resin, via a timed dispersion, an observed dispersibility or an initial dispersion viscosity; the ability of the resin to thicken by measuring its neutralized mucilage viscosity at several mucilage levels: namely 0.2 percent resin content mucilage, 0.5 percent resin content mucilage, and 1.0 percent resin content mucilage; and its viscosity in the presence of a salt (NaCl) at concentrations of 0.2, 0.5, 1.0, and 3.0%, which is referred to as Salt Sensitivity.

The characterization data was obtained using one or more of the following procedures:

Dispersibility

Dispersion times were done using a 1% dispersion (4 g resin/396 g water) prepared in demineralized (DM) water, using a Servodyne mixer (Cole Parmer) with an S-paddle at 400 rpm. The resin was introduced through a 20 mesh screen, with stirring. The speed of hydration was visually assessed by the transparency of the wetted swollen microgels. The more transparent the microgel particle appears to be, the faster is the speed of hydration. When an agglomeration of microgels or "fisheyes" occurred, the powder was considered not to be "easy to disperse". Typically, if the product was dusty, i.e., fine, it was also not was easy to disperse.

Clarity

A clarity measurement is the percentage of light transmitted through the dispersed, hydrated and neutralized polymer at a resin concentration of 0.5%. Clarity is measured with a Brinkman PC 801 colorimeter at 420 nanometers (nm). The higher the percent transmittance, the better the clarity. A transmittance of greater than 60% is acceptable.

Thickening Viscosity

A 1% stock dispersion of resin or interpolymer (8 g resin/792 g water) was prepared in demineralized (DM) water, using a Lightnin' mixer at 1,000 rpm with a 3-blade marine impeller. The resin was introduced through a 20 mesh screen with stirring and the dispersion was mixed for a total of one hour. The viscosity of the dispersion is referred to as the Dispersion Viscosity or Un-neutralized Viscosity. Dispersions can also be made with 2.5% resin, in which case the amounts are adjusted proportionately. An easy to disperse and easy to handle polymer will have a low dispersion time, in terms of minutes to disperse, while also having a relatively low dispersion (i.e., Un-neutralized) Viscosity. For example, at 1% resin an Un-neutralized Dispersion Viscosity of less than 1000 centipoise (cPs) would be desirable, while at 2.5% resin an Un-neutralized Viscosity of less than 6000 cPs is desirable.

The 1% stock dispersion was then used to make the following typical concentrations for analysis, some or all of which may be measured:

0.2% Mucilage (80 g of stock dispersion diluted to a total of 400 g with DM water)

0.5% Mucilage (200 g of stock dispersion diluted to a total of 400 g with DM water)

1.0% Mucilage (400 g of stock dispersion used as is)

These dispersions are neutralized to pH 7.3-7.8 with 18% NaOH using an S-paddle at 300 rpm for 3-5 minutes, after which the mucilages were allowed to stand at room temperature for at least 30 minutes.

The samples were then measured for pH and Brookfield Viscosity using a Brookfield RVT-DV Viscometer at 20 rpm. The viscosity of the neutralized dispersions is referred to as the Neutralized Viscosity. A Neutralized Viscosity of more than 20,000 cPs at 0.5% resin concentration is desirable.

Salt Sensitivity

Salt sensitivity on 1.0% mucilages are evaluated at 1.0% salt concentrations in the following manner:

Using the same sample from the Brookfield Viscosity study, NaCl is added in solid form with stirring using an S-paddle at 300 rpm for 3-5 minutes. Actual salt additions of 2.0 g are made with the with Brookfield Viscosities being read between additions. The results are reported as Salt Sensitivity Viscosity. A high viscosity is desirable since it shows that there is not a severe impairment of the viscosity by the salt.

EXAMPLES 1-11

A number of polymers were produced in accordance with the typical co-interpolymer process example and tests were conducted to characterize those polymers. The results are reported in Table I. The steric stabilizing surfactants employed are commercially available from ICI Americas, under the brand name Hypermer; and from Phoenix Chemical, Inc. under the brand name Pecosil with the surfactants identified in Table I, and elsewhere, as follows:

1) Hypermer B239 surfactant is a block copolymer of polyhydroxy fatty acid (PFA) and poly(ethylene oxide) (EO), and has a molecular weight (MW) of about 3500.
2) Hypermer B246 surfactant is a block copolymer of PFA and EO and has a MW of about 7500.
3) Hypermer B261 surfactant is a block copolymer of PFA and EO and has a MW of about 9600.
4) Hypermer 2234 surfactant is a nonionic polymeric surfactant.
5) Hypermer LP6 surfactant is a polymeric fatty ester and has a MW of about 4300.
6) Hypermer E-464 surfactant is a copolymer of a long-chain alkylene hydrophobe and various anionic/nonionic hydrophiles and has a MW of about 2300.

7) Hypermer IL2296 surfactant is a nonionic polymeric surfactant.
8) Hypermer A-109 surfactant is a block copolymer of a fatty acid or long chain alkylene and EO.
9) Hypermer A-409 surfactant is a block copolymer of a fatty acid or long chain alkylene and EO.
10) Pecosil PS-100 surfactant is a dimethicone copolyol phosphate polymer having 5-12 moles of ethylene oxide per mole of hydrophilic unit.
11) Pecosil WDS-100 surfactant is a dimethicone copolyol phosphate polymer having 5-12 moles of propylene oxide per mole of hydrophilic unit. All of the interpolymers were made at 17% by weight of acrylic acid-co-acrylate ester solids in the polymerization, except for the control, i.e., where no polymeric steric stabilizer is employed, which was done at 11% by weight solids, which is the upper limit of manufacture without the use of a surfactant.

steric stabilizer was varied in an amount of between 0.25% and 5.0% by weight based upon the weight of the monomer (parts per hundred weight of monomer or phm) while the amount of crosslinker was held constant (Examples 18-25). In all the examples, the polymerization solids, the vinylic monomers, i.e., the amount of acrylic acid plus co-acrylate ester monomer solids, was 15% by weight based upon the total weight of the vinylic monomers plus the polymerization solvent. The characterization results of the polymer are reported in Table II, and they demonstrate that polymers in accordance with the present invention can be made by varying the steric stabilizing surfactant or its amount, the crosslinker levels, to achieve acceptable thickening performance levels.

TABLE I

| Ex. No. | Monomers(s) | Polymeric Steric Stabilizer | (phm) | Time to Disperse (min.) | 1% Resin Un-neutralized Dispersion Viscosity (cPs) | 1% Resin Neutralized Viscosity (cPs) | Salt Sensitivity Viscosity (cPs) 1% Resin and 1% NaCl |
|---|---|---|---|---|---|---|---|
| 1 | AA/SMA | None | — | 75 | 2,410 | 35,800 | 9,300 |
| 2 | AA/SMA | Hypermer LP6 | 1.0 | 5 | 710 | 37,200 | 9,450 |
| 3 | AA/SMA | Hypermer 2234 | 1.0 | 5 | 970 | 33,400 | 9,600 |
| 4 | AA/SMA | Hypermer LP6 | 1.0 | 5 | 1,260 | 36,000 | 10,000 |
| 5 | AA/SMA | Hypermer IL2296 | 1.0 | 5 | 214 | 45,400 | 8,200 |
| 6 | AA/SMA | Hypermer B246 | 1.0 | 5 | 270 | 39,600 | 7,650 |
| 7 | AA/SMA | Hypermer E464 | 1.0 | 10 | 85 | 49,200 | 6,700 |
| 8 | AA/SMA | Hypermer A-109 | 1.0 | 15 | 732 | 54,000 | 7,000 |
| 9 | AA/SMA | Hypermer A-409 | 1.0 | 15 | 412 | 46,400 | 7,700 |
| 10 | AA/SMA | Pecosil WDS-100 | 1.0 | 15 | 272 | 40,000 | 8,850 |
| 11 | AA/SMA | Pecosil PS-100 | 1.0 | 15 | 22 | 65,500 | 6,050 |

AA = Acrylic acid.
SMA = Stearyl methacrylate (used with AA to designate a copolymer).

These results clearly show that an interpolymer, made from comonomers, incorporating a steric stabilizer in accordance with the present invention, is easier to disperse while retaining good ultimate thickening properties. The dispersion times for the Un-neutralized Dispersions are less than 15 minutes when compared to 75 minutes for the control resin (i.e., no steric stabilizer), and the interpolymers generally achieve less than 1000 cPs un-neutralized viscosities. The neutralized resins have viscosities of greater than 20,000 cPs, and the interpolymers show good salt sensitivity.

EXAMPLES 12-25

To illustrate that the interpolymers can be produced under varying amounts of steric stabilizer and/or varying amounts of crosslinker, polymers were prepared in accordance with the typical co-interpolymer reaction, using Hypermer B-239 surfactant as the steric stabilizer. The amount of crosslinker (i.e., allylpentaerythritol) was varied between 0.2 and 1.2 percent by weight based upon the weight of the polymer (or phm or parts per hundred of monomer), while the amount of steric stabilizer was held constant. (Examples 12-17) Then the

TABLE II

| Ex. | Crosslinker (phm) | Steric Stabilizer dose (phm) | Neutralized Viscosity (cPs) 1.0% Resin | 1% Salt Sensitivity Viscosity (cPs) |
|---|---|---|---|---|
| 12 | 0.2 | 1.0 | 4,020 | 7,600 |
| 13 | 0.4 | 1.0 | 11,400 | 7,800 |
| 14 | 0.6 | 1.0 | 31,000 | 8,250 |
| 15 | 0.8 | 1.0 | 67,000 | 7,450 |
| 16 | 1.0 | 1.0 | 109,000 | 5,200 |
| 17 | 1.2 | 1.0 | 137,000 | 3,300 |
| 18 | 0.6 | 0.25 | 34,600 | 7,900 |
| 19 | 0.6 | 0.50 | 38,000 | 8,650 |
| 20 | 0.6 | 0.75 | 34,800 | 8,200 |
| 21 | 0.6 | 1.0 | 31,000 | 8,250 |
| 22 | 0.6 | 1.5 | 36,000 | 7,950 |
| 23 | 0.6 | 2.0 | 39,200 | 7,700 |
| 24 | 0.6 | 3.0 | 43,400 | 7,250 |
| 25 | 0.6 | 5.0 | 50,000 | 6,850 |

Further, the fact that some bonding or interpolymerization, as defined herein, is taking place, is supported by the relationship between the amount of crosslinker and the amount of steric stabilizing surfactant. As shown by the data in Table II, the neutralized viscosity increases with increasing levels of steric stabilizer, although not to the same extent as occurs with crosslinking, so the results support the premise that the steric stabilizing surfactant becomes part of the polymer as an interpolymer. Alternatively, the data demonstrates unexpectedly that the use of increasing amounts of steric stabilizer, in accordance with the present invention, produces increased thickening efficiency without increasing the amount of crosslinker.

EXAMPLES 26-32

In some further tests using another steric stabilizer (Hypermer 2234 surfactant) to prepare polymers in accordance with the typical AA interpolymer reaction, at 12% vinylic monomer solids, similar results were obtained at various doses of crosslinker or steric stabilizers. The results, reported in Table III, show very good Un-neutralized Dispersion viscosities at 2.5% resin concentration, and similar results for the Neutralized Viscosities. While the clarity is not as desirable at high doses of steric stabilizer, the other values suggest superiority in uses where clarity is not important.

TABLE III

| Ex. No. | Steric Stabilizer Dose (phm) | Cross-Linker (phm) | Un-Neutralized Dispersion Visc at 2.5% Resin Conc. (cPs) | Neutralized Visc at 0.5% Resin Conc. (cPs) | Clar. (% T) |
|---------|---|---|---|---|---|
| 26 | 4.0 | 0.5 | 890 | 17,000 | 85 |
| 27 | 4.0 | 0.7 | 238 | 39,000 | 88 |
| 28 | 4.0 | 0.9 | 25 | 80,000 | 77 |
| 29 | 2.0 | 0.7 | 5,400 | 20,000 | 89 |
| 30 | 4.0 | 0.7 | 470 | 23,000 | 86 |
| 31 | 8.0 | 0.7 | 70 | 38,000 | 72 |
| 32 | 12.0 | 0.7 | 8 | 50,000 | 44 |

EXTRACTION EXAMPLES

To further illustrate the thesis of interpolymerization between the carboxylic acid polymer and the steric stabilizing surfactant and to understand the influence of hydrogen bonding on the surface of the particles, four polyacrylic acid interpolymers were prepared in accordance with the present invention, plus a control of polyacrylic acid polymer in accordance with U.S. Pat. No. 4,996,274, at 11.5% total solids, in a cosolvent blend, without using a crosslinker. The samples consist of a control (i.e., without steric stabilizing surfactant), along with the four samples prepared with 5% by weight, based upon the weight of the acrylic acid monomers, of a steric stabilizer, namely, Hypermer ® B-239, B-246, or B-261 surfactant, added to the monomer premix prior to initiation of the polymerization and a "post-add" control sample in which a control sample was reslurried in cosolvent and 5% steric stabilizer (Hypermer B-261 surfactant) was added (i.e., post added) to the slurry which was then dried. A 100 g sample of each polymer was then subjected to solvent extraction (methylene chloride) using a soxhlet extractor for one week. The extracting solvent was then evaporated on a rotary evaporator and the percent extractable (% ext.) calculated. Molecular weight data was also obtained on the steric stabilizers (before and after extraction) along with the resin produced in the polymerization. In the table, Mw represents the weight average molecular weight, while Mn represents the number average molecular weight. The data is summarized in the following Table IV.

TABLE IV

| Composition | Polymer Mw | Mn | % Ext. | Mw/Mn |
|---|---|---|---|---|
| Control | 353,000 | 20,800 | | 16.97 |
| Post-Add w/B-261 | 353,000 | 20,800 | 50.1 | 16.97 |
| Extracted B-261 | 5,500 | 2,210 | | 2.51 |
| Pure B-239 | 3,490 | 2,250 | | 1.56 |
| Interpolymer w/5% B-239 | 319,000 | 21,400 | 58.4 | 14.91 |
| Extracted B-239 | 3,210 | 1.860 | | 1.72 |
| Pure B-246 | 7,470 | 3,810 | | 1.96 |
| Interpolymer w/5% B-246 | 324,000 | 21,200 | 28.4 | 15.28 |
| Extracted B-246 | 5,180 | 1,990 | | 2.60 |
| Pure B-261 | 9,620 | 4,360 | | 2.20 |
| Interpolymer w/5% B-261 | 334,000 | 33,600 | 26.4 | 9.94 |
| Extracted B-261 | 3,620 | 1,340 | | 2.70 |

As can be seen from the data above, the use of a steric stabilizer has little effect on weight average molecular weight (Mw) of the polymer. However, the ability to extract the steric stabilizer decreases as the molecular weight of the steric stabilizer increases, presumably due to interpolymer chain entanglements. This can be corroborated by the fact that it is possible to extract nearly twice as much of the Hypermer B-261 surfactant out of the post added sample of polyacrylic acid as in the pretreatment case. The fact that not all the Hypermer B-261 surfactant in the post add case is extractable is explained by the high affinity for hydrogen bonding between the polyethylene oxide blocks in the steric stabilizers and the carboxylic acids on the surface of the resin particles. The strength of the hydrogen bonded complex will be related to the relative length of the polyethylene oxide block, the greater the number of hydrogen bonded sites, the stronger the complex.

The molecular weight data on the steric stabilizers (before and after extraction) also substantiates the molecular weight dependency on extractability. In the case of Hypermer ® B-239 surfactant, the molecular weight data is very close between the pure and extracted samples, indicating a uniform extraction. In the case of Hypermer ® B-246 and B-261 surfactants the extracted molecular weight is significantly lower than the pure material, with the Hypermer B-261 surfactant being the lowest. This shows a definite bias for the extractability of the low molecular weight fractions in the steric stabilizers. Similarly in the post add case of Hypermer B-261 surfactant, the extractable molecular weight is significantly lower than the pure material, but not to the extent as in the polymerized case. This seems to give a measure of the difference in hydrogen bonding complex formation and inter-polymer chain entanglements.

INITIATOR EXAMPLE

To illustrate that other initiators can be employed to produce an interpolymer in accordance with the present invention, Vazo ® 67, which is azobis(2-methyl butyronitrile), and available from the E. I. du Pont de Nemours & Company, Inc. was substituted for the di-(2-ethylhexyl)peroxydicarbonate used in the typical copolymer reaction and an interpolymer was produced that had a neutralized viscosity of 80,000 cPs at 1.0% resin concentration and a clarity of 89%, which are desirable end thickening properties.

SOLVENT EXAMPLES

EXAMPLE A

To illustrate the applicability of the present invention to the polymerization in additional solvents, cyclohexane was employed as the solvent in accordance with the typical co-interpolymer reaction, at crosslinker levels of 0.6 and 0.8 parts per hundred vinylic monomer (phm) and 12% total solids using Hypermer 2234 surfactant at a dose of 4.0 phm, and an interpolymer was produced which achieved dispersion viscosities of 320 and 15 cPs at 2.5% resin concentration, 11,000 and 37,000 cPs neutralized viscosity at 0.5% resin concentration, and clarity of 88 and 48%, respectively.

EXAMPLE B

In another example, 536.3 g of mineral spirits (flash point 140° C.) was charged to a 2 liter stirred reactor. A mixture of mineral spirits (50 g), acrylic acid (51.5 g) trimethylol propane diallyl ether (TMPDAE) (1.73 g), Hypermer® 2234 surfactant (9.2 g) and Witconate C-5685 surfactant (dodecylbenzenesulfonic acid, isopropylamine salt, 85% in mineral spirits) (9.2 g) were charged to the reactor. The container containing the reagents was rinsed with 50 g of mineral spirits, and the mineral spirits solution was then charged to the reactor. The mixture was sparged with dry nitrogen for about 30 min. then a solution of 4.95 g of 0.88% 2-ethylhexylperoxydicarbonate in mineral spirits was added to the reaction mixture. The mixture was heated to 72° C. Polymerization was evidenced by the formation of turbidity. One-half hour after the polymer formation started, metering of a mixture of acrylic acid (373.6 g), TMPDAE (4.85 g), Hypermer® 2234 surfactant (12.4 g) and Witconate C-5685 surfactant (12.4 g) was started. Metering was done at a constant rate over 3.0 hr. A solution of 0.88% 2-ethylhexylperoxydicarbonate (EHP) in mineral spirits was added concurrently with the monomer mixture at a rate of about 0.11 ml per min. Percarbonate metering was continued for ½ hour after the monomer metering. Then a solution of 0.425 g of 2-ethylhexylperoxydicarbonate in 5 ml of mineral spirits was added to the reaction mixture in one portion. Total mineral spirits added as diluent for EHP was approximately 30 g. The mixture was held at 72° C. for 1 hr. and then was allowed to cool. The fluid slurry discharged easily. There was only a small accumulation of solid on the stirrer and on the upper reactor walls. The neutralized viscosity of the polymer at 0.5% mucilage was 45,200 cPs. EXAMPLE C Example A was repeated using a different cut of mineral spirits, namely, one having a flash point of 175° F. The resulting polymer, at a 0.5% mucilage, had a neutralized viscosity of 43,500 cPs which demonstrates that the same results can be achieved using different solvents.

EXAMPLE D

A two liter jacketed reactor, equipped with an agitator (turbine blades), a reflux condenser topped with a nitrogen inlet, and a septum capped inlet for the monomer premix, was charged with 140° flash point mineral spirits (666.3 g), acrylic acid (59.4 g), TMPDAE, (trimethylolpropane diallyl ether, 1.99 g), Hypermer® B-239 surfactant (5.3 g), Witconate C-5685 surfactant (10.62 g), and Vazo® 67 initiator (0.99 g). The reaction mixture was sparged with dry nitrogen for 15 minutes at room temperature and then the reaction mixture was heated to 72° C. with sparging for an additional 15 minutes. Solid appeared about 10 minutes after increasing the heat to 72° C. After sparging a total of 30 minutes, the sparge tube was removed and the reaction mixture was held under a nitrogen blanket for the duration of the reaction. Stirring was begun. About 30 minutes after the first appearance of solid, metering of a monomer premix containing acrylic acid (431.1 g), TMPDAE (5.6 g), Hypermer® B-239 surfactant (7.15 g) and Witconate C-5685 surfactant (14.31 g). Metering of the monomer premix took about 4.6 hours. The last 35 ml of monomer was run rapidly into the reactor and the temperature was increased to 90° C. After 1 hour at 90° C., the reaction mixture was allowed to cool.

The efficiency of this product was tested by making sodium hydroxide-neutralized mucilages in water. At 0.2% polymer, the Brookfield viscosity was 3200 cPs. At 0.5% it was 45,000 cPs, and at 1.0% the Brookfield viscosity was 76,000 cPs. For comparison, a polymer made at the same crosslinker level (1.5% based on acrylic acid) and polymerized by the method of U.S. Pat. No. 4,420,596 gave Brookfield viscosities of 2,200, 17,800, and 29,400 cPs at 0.2%, 0.5%, and 1.0% concentrations. Thus, the polymer of this invention was much more efficient than a similar polymer prepared by the method of U.S. Pat. No. 4,420,596.

When a similar polymerization is carried out by the method of U.S. Pat. No. 4,692,502, using 1.5% TMPDAE (acrylic acid basis), the product gives a mucilage viscosity of about 25,000 cPs at 1.0% and about 12,000 cPs at 0.5% polymer. Thus the polymer of this invention was much more efficient than that taught by U.S. Pat. No. 4,692,502. In fact, by increasing the crosslinker level to 2.0 weight percent in a polymer made by the '502 patent, the viscosities of 0.5% and 1.0% mucilages increased to only 28,500 and 50,000 cPs respectively.

COMPARATIVE EXAMPLES

To understand how the present invention, which employs a steric stabilizing surfactant, compares to products produced using conventional surfactants, as employed in the prior art patents discussed in the Background of the Invention, a number of tests were run using the typical acrylic acid interpolymer reaction, a crosslinker level of 1 phm (vinylic monomer basis) and a dosage of 5 phm of steric stabilizer. The tests were designed to run at 17% by weight vinylic monomer solids (TS), but in most of the instances it was necessary to add solvent to allow the reaction to proceed. So, the total solids (TS) is reported as the maximum (max.) the surfactant would permit. The results are reported in Table V.

TABLE V

| Ex. No. | Surfactant | T.S. (max.) | Un-Neutralized Dispersion Viscosity (cPs) | | Neutralized Viscosity at | Salt Sensitivity |
|---|---|---|---|---|---|---|
| | | | 1.0% Resin Conc. | 2.5% Resin Conc. | 1.0% Resin Conc. (cPs) | at 1% Resin in 1% NaCl (cPs) |
| 41 | None | 11.0 | 1,550 | 10,800 | 69,000 | 6,050 |
| 42 | Pluronic 25 | 15.0 | 845 | 4,900 | 26,700 | 4,080 |

TABLE V-continued

| Ex. No. | Surfactant | T.S. (max.) | Un-Neutralized Dispersion Viscosity (cPs) | | Neutralized Viscosity at 1.0% Resin Conc. (cPs) | Salt Sensitivity at 1% Resin in 1% NaCl (cPs) |
|---|---|---|---|---|---|---|
| | | | 1.0% Resin Conc. | 2.5% Resin Conc. | | |
| | R4 | | | | | |
| 43 | Pluronic P65 | 15.0 | 17.5 | 1,650 | 124,000 | 2,770 |
| 44 | Brij 35 | 15.9 | 100 | 3,450 | 79,000 | 4,030 |
| 45 | Span 20 | 12.75 | 30 | 3,450 | 133,000 | 4,080 |
| 46 | Span 60 | 12.75 | 23.5 | 2,750 | 124,000 | 4,080 |
| 47 | Pluronic L62-LF | 13.8 | 900 | 6,600 | 38,200 | 4,660 |
| 48 | Tetronic 150 R1 | 16.45 | 865 | 6,250 | 57,000 | 5,200 |
| 49 | Hypermer B-246 | 17.0 | 7 | 22 | 150,000 | 3,300 |
| 50 | PEG 600 Distearate | 13.8 | 47 | 5,300 | 129,000 | 5,550 |

A number of these surfactants incorporate polyethylene glycol (PEG) (or polyoxyethylene) groups in the molecule such as PEG ethers (Brij brand surfactants), and Triton brand surfactants), PEG diesters, PEG polysorbate esters (Tween surfactants), fatty acid partial esters of sorbitan (Span surfactants), and ethylene oxide block copolymers (Pluronic brand surfactants). The results demonstrate that the interpolymers of the present invention have initial dispersion viscosities generally lower, as compared to conventional surfactants, indicating an easier to disperse polymer, while possessing the high mucilage viscosity desired in a polymeric thickener.

ADDITIONAL COMPARATIVE EXAMPLES

Finally, a number of tests were run using other commercially available surfactants, comparing them to steric stabilizing surfactants in accordance with the present invention. All the surfactants were dosed at 5 phm, at 0.8 phm crosslinker, at a targeted 17% total vinylic monomer solids (TS), with the interpolymers were made accordingly to the typical AA interpolymer reaction. Since additional solvent was sometimes necessary to allow the reaction to proceed, the solids (TS) is reported as the maximum (Max.) percentage of total solids. The results are reported in Table VI and show that interpolymers, in accordance with the present invention, would achieved desirable neutralized dispersion viscosities equal to or more than 20,000 cPs at 0.5%, un-neutralized dispersion viscosities of less than 6,000 cPs at 2.5%, clarities of equal to or more than 60% transmittance, and obtain the target of 17% total solids.

TABLE VI

| Ex. No. | Surfactant | Un-neutralized Dispersion Visc at 2.5% Resin Conc. (cPs) | Neutralized Visc at 0.5% Resin Conc. (cPs) | Clar. (% T) | Max. % T.S. |
|---|---|---|---|---|---|
| 51 | Hypermer B-239 | 112 | 30,000 | 90 | 12.75 |
| 52 | Hypermer B-246 | 18 | 58,000 | 88 | 17.0 |
| 53 | Hypermer B-261 | 8 | 66,000 | 84 | 17.0 |
| 54 | Brij 30 (PEG Ethers Laureth-4) | 8,750 | 44,000 | 94 | 12.75 |
| 55 | Brij 15 (Laureth-23) | 10 | 300 | 30 | 13.42 |
| 56 | Brij 52 (Ceteth-2) | 2,925 | 44,000 | 85 | 12.75 |
| 57 | Brij 56 (Ceteth-10) | 11,400 | 28,000 | 95 | 12.75 |
| 58 | Brij 58 (Ceteth-20) | 9,800 | 24,000 | 96 | 13.42 |
| 59 | PEG-4 Dilaurate (PEG Diesters) | 11,000 | 52,000 | 40 | 12.75 |
| 60 | PEG-4 Dioleate (PEG Diesters) | 7,250 | 30,000 | 49 | 12.14 |
| 61 | PEG-9 Dioleate (PEG Diesters) | 5,750 | 24,000 | 84 | 12.14 |
| 62 | PEG-13 Dioleate (PEG Diesters) | 3,250 | 43,000 | 83 | 12.75 |
| 63 | PEG-25 Castor Oil (Nonionic Alkoxylates) | 12 | 7,000 | 7 | 15.94 |
| 64 | PEG-30 Castor Oil (Nonionic Alkoxylates) | 45 | 27,000 | 50 | 15.94 |
| 65 | PEG-40 Castor Oil (Nonionic Alkoxylates) | 38 | 20,000 | 44 | 15.94 |
| 66 | Tween 21 (Polysorbate Esters) | 10,700 | 18,000 | 95 | 13.42 |

TABLE VI-continued

| Ex. No. | Surfactant | Un-neutralized Dispersion Visc at 2.5% Resin Conc. (cPs) | Neutralized Visc at 0.5% Resin Conc. (cPs) | Clar. (% T) | Max. % T.S. |
|---|---|---|---|---|---|
| 67 | Tween 20 (Polysorbate Esters) Laurate (EO = 20) | 7,000 | 17,000 | 95 | 12.75 |
| 68 | Tween 61 (Polysorbate Esters) Stearate (EO = 4) | 12 | 32,000 | 24 | 13.42 |
| 69 | Tween 60 (Polysorbate Esters) Stearate (EO = 20) | 9,400 | 10,000 | 96 | 13.42 |
| 70 | Pluronic 25 R 4 (Meroxapols-254 block copolymer of EO/PO) | 4,950 | 10,000 | 89 | 15.00 |
| 71 | Pluronic 25 R 8 (Meroxapols-258 block copolymer of EO/PO) | 4,350 | 7,000 | 94 | 15.00 |
| 72 | Pluronic 31 R 1 (Meroxapols-311 block copolymer of EO/PO) | 2,850 | 38,000 | 89 | 17.00 |
| 73 | Makon NF5 Nonoxynol-5 (Ethoxylated Alkyl Phenols) | 6,400 | 42,000 | 93 | 14.17 |
| 74 | Nonoxynol-12 NF12 (Ethoxylates Alkyl Phenols) | 6,550 | 37,000 | 59 | 14.17 |
| 75 | Triton X15 (Nonoxynol-1) | 8,850 | 19,000 | 2 | 12.14 |
| 76 | Triton X35 (Nonoxynol-3) | 7,150 | 64,000 | 54 | 12.14 |
| 77 | Triton X35 (Nonoxynol-5) | 9,600 | 28,000 | 94 | 12.75 |
| 78 | Igepal DM-430 (Dialkylphenoxy poly(ethyleneoxyethanol)) | 500 | 43,000 | 87 | 12.75 |
| 79 | Igepal DM-730 (Dialkylphenoxy poly(ethyleneoxyethanol)) | 4,400 | 8,000 | 94 | 17.0 |
| 80 | Stepfac PN-209 (Phosphate Ester) | 6,200 | 16,000 | 97 | 12.75 |
| 81 | Pecosil PS 100 (Dimethicone Copolyol Phosphate) | 15 | 32,000 | 45 | 17.0 |
| 82 | Pecosil WDS-100 (Dimethicone Copolyol Phosphate) | 60 | 62,000 | 72 | 17.0 |
| 83 | Dowfax 3B0 (Decyl(sulfophenoxy) benzenesulfonic acid) | 1,500 | 8,000 | 94 | 12.14 |
| 84 | Steol CS-460 (Alcohol Ethoxy Sulfate) | 1,200 | 42,000 | 92 | 13.42 |
| 85 | Lubrizol 2632 (Polyolefin Amide Alkeneamine) | 1,225 | 50,000 | 45 | 13.42 |
| 86 | Lubrizol 2633 (Polyolefin Amide Alkeneamine) | 560 | 40,000 | 38 | 13.42 |
| 87 | Tetronic 150 R1 (Alkylated Diamine) | 7,950 | 23,000 | 94 | 15.00 |

In summary, this invention claims an interpolymer which by utilizing a steric stabilizing surfactant in the polymerization of the resin is easy to disperse and/or has increased efficiency. These resins disperse in minutes when added to water, yield lower un-neutralized dispersion viscosities and have no detrimental effects on final application properties.

The foregoing embodiments of the present invention have been presented for purposes of illustration and description. These description and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated. It is intended that the invention be defined by the following claims.

What we claim is:

1. An interpolymer of
(1) at least one olefinically unsaturated carboxylic acid or anhydride containing at least one activated carbon-to-carbon olefinic double bond and at least one carboxyl group, in an amount of more than 15% by weight based upon the weight of the interpolymer, and (2) at least one steric stabilizer having at least one hydrophilic moiety and at least one hydrophobic moiety, selected from the group consisting of linear block copolymeric steric stabilizers, having a hydrophobic moiety having a length of more than 50 Angstroms, random copolymeric comb steric stabilizers, and mixtures thereof.

2. The interpolymer of claim 1 wherein said steric stabilizer is present in an amount of 0.001 to 15% by weight based upon the weight of said carboxylic acid or said anhydride.

3. The interpolymer of claim 1 wherein said steric stabilizer is present in an amount of 0.1 to 10% by weight based upon the weight of said carboxylic acid or said anhydride.

4. The interpolymer of claim 1 wherein said steric stabilizer is present in an amount of 0.2 to 6.0% by weight based upon the weight of said carboxylic acid or said anhydride.

5. The interpolymer of claim 1, wherein said linear block copolymeric steric stabilizer is defined by the following formula:

$$C_w(B-A-B_y-_xD_z,$$

wherein A is a hydrophilic moiety having a solubility in water at 25° C. of 1% or greater, a molecular weight of from about 200 to about 50,000, and selected to be covalently bonded to B;

B is a hydrophobic moiety having a molecular weight of from about 300 to about 60,000, a solubility of less than 1% in water at 25° C., capable of being covalently bonded to A;

C and D are terminating groups which can be A or B, can be the same or different groups, w is 0 or 1;

x is an integer of 1 or more, y is 0 or 1, and z is 0 or 1.

6. The interpolymer of claim 1, wherein said random copolymeric comb steric stabilizer, it is defined by the following formula:

$$R_1-(Z)_m-(Q)_n-R_2$$

where $R_1$ and $R_2$ are terminating groups and may be the same or different and will be different from Z and Q, Z is a hydrophobic moiety having a solubility of less than 1% in water at 25° C., Q is a hydrophilic moiety, having a solubility of more than 1% in water at 25° C., and m and n are integers of 1 or more, and are selected such that the molecular weight is from about 100 to about 50,000.

7. The interpolymer of claim 1 wherein said block copolymer is a block copolymer of 12-hydroxystearic acid.

8. The interpolymer of claim 7 wherein said polymer of 12-hydroxystearic acid is a block copolymer with polyethylene oxide.

9. The interpolymer of claim 7 wherein said polymer of 12-hydroxystearic acid is an ABA block copolymer.

10. The interpolymer of claim 1 wherein in said carboxylic acid, said olefinic double bond is in the alpha-beta position with respect to a carboxyl group, or is part of a terminal methylene group.

11. The interpolymer of claim 1 wherein said carboxylic acid is selected from the group consisting of acrylic acid, methacrylic acid, and maleic acid.

12. The interpolymer of claim 1 wherein said anhydride is maleic anhydride.

13. The interpolymer of claim 1 wherein said carboxylic acid or anhydride is present in amounts greater than 40 weight percent based upon the weight of the interpolymer.

14. The interpolymer of claim 1 wherein at least one olefinically unsaturated monomer containing at least one $CH_2=C<$ group is copolymerized therewith.

15. The interpolymer of claim 14 wherein said olefinically unsaturated monomer is an acrylamide or substituted acrylamide.

16. The interpolymer of claim 12 wherein at least one $C_1-C_5$ alkyl vinyl ether is polymerized therewith.

17. The interpolymer of claim 16 wherein at least one $C_2-C_{30}$ alpha olefin is polymerized therein.

18. The interpolymer of claim 1 wherein there is present less than 5 weight percent based upon the weight of the carboxylic acid or anhydride of a polyfunctional crosslinking vinylidene monomer containing at least two terminal $CH_2<$ groups.

19. The interpolymer of claim 18 wherein said crosslinking monomer is selected from the group consisting of allyl pentaerythritol, allyl sucrose and trimethylolpropane diallylether.

20. The interpolymer of claim 1 further including at least one acrylic acid ester of the formula:

$$CH_2=\overset{R^2}{\underset{|}{C}}-\overset{O}{\underset{\|}{C}}-O-R^3$$

wherein $R^2$ is hydrogen, methyl or ethyl and $R^3$ is an alkyl group containing 1 to 30 carbon atoms, in an amount of less than 30 weight percent based upon the weight of the carboxylic acid or anhydride plus the acrylic acid ester.

21. The interpolymer of claim 20 wherein $R^2$ is hydrogen or methyl and $R^3$ is an alkyl group containing 2 to 20 carbon atoms.

22. The interpolymer of claim 1 wherein said comb steric stabilizer is a polymer of dimethicone copolyol phosphate.

* * * * *